(12) United States Patent
Bass et al.

(10) Patent No.: US 7,243,573 B2
(45) Date of Patent: Jul. 17, 2007

(54) FOLDING HANDLEBAR

(75) Inventors: Steedman Liddell Bass, 6 Shepard St. #2, Cambridge, MA (US) 02138; Mark A. Sanders, Windsor (GB)

(73) Assignee: Steedman Liddell Bass, Cambridge, MA (US)

( * ) Notice: Subject to any disclaimer, the term of this patent is extended or adjusted under 35 U.S.C. 154(b) by 1 day.

(21) Appl. No.: 10/404,005

(22) Filed: Mar. 28, 2003

(65) Prior Publication Data

US 2004/0187627 A1    Sep. 30, 2004

(51) Int. Cl.
*B62K 21/12* (2006.01)
(52) U.S. Cl. .................................... 74/551.1
(58) Field of Classification Search ............. 74/551.3, 74/551.1; 280/279, 276, 278, 287
See application file for complete search history.

(56) References Cited

U.S. PATENT DOCUMENTS

| | | | | |
|---|---|---|---|---|
| 583,105 A | * | 5/1897 | Wheeler | .................. 74/551.4 |
| 598,202 A | * | 2/1898 | Harrell | .................. 74/551.4 |
| 4,611,818 A | * | 9/1986 | Cammarata | ................. 280/278 |
| 4,824,130 A | * | 4/1989 | Chiu | ......................... 280/287 |
| 6,234,042 B1 | * | 5/2001 | An | ............................. 74/551.5 |
| 6,637,288 B2 | * | 10/2003 | Chu | .......................... 74/551.3 |
| 2002/0148324 A1 | * | 10/2002 | Bandarra | ................... 74/551.4 |
| 2003/0033900 A1 | * | 2/2003 | Chu | .......................... 74/551.3 |

* cited by examiner

*Primary Examiner*—Vicky A. Johnson
(74) *Attorney, Agent, or Firm*—James D. Ivey (57) ABSTRACT

A split cylindrical clamp encloses inner ends of grip bars of a folding handlebar to hold the grip bars in a firm, stationary, and strong riding position. A single user gesture flips a clamp lever to loosen the split cylindrical clamp allows the grip bars to be slid outward and folded to a folded position. The split cylindrical clamp is then tightened with another single gesture, flipping the clamp lever in an opposite direction, locking the grip bars in the folded position. While locked in the folded position, the grip bars are entirely immobilized.

8 Claims, 11 Drawing Sheets

BARS CLAMPED 'OPEN'

FIGURE 3

BARS CLAMPED 'CLOSED'

CIRCULAR CUT OUT TO CLAMP BARS IN THIS POSITION

FOLDING HANDLEBAR

FIELD OF THE INVENTION

The present invention relates to folding handlebars and, in particular, to a folding handlebar which is particularly strong while simultaneously minimizing wear on parts.

BACKGROUND OF THE INVENTION

In recent decades, popularity of folding bicycles has grown significantly as populations increase in density and reliance on public transportation. Public transportation often fails to deliver commuters precisely to their respective destinations. Accordingly, most people using public transportation must resort to walking for a relatively small, yet significant, distance. Bicycles tend to be unsatisfactory adjuncts to public transportation since bicycles are relatively large and bulky items which cannot be easily carried on public transportation such as buses and trains.

One substantially successful transportation mechanism for bridging the gaps in public transportation for individual commuters is the folding bicycle. Currently available folding bicycles can fold to sizes smaller than a typical small suitcase and yet ride nearly as easily as a regular bicycle. To achieve such small sizes, folding bicycles typically involve intricate and complex mechanical solutions. One area in which substantial attention in devoted is that of the handlebars.

Most folding bicycles either use a folding handlebar stem or require that the front wheel and tire be removed for complete folding. Removing the front wheel of a bicycle can be awkward, especially for a commuter, since the removed wheel is a detached piece of equipment that must either (a) somehow be attached to the rest of the folded bicycle or (b) be carried separately. Designing the handlebar to be foldable introduces weakness and perhaps unwanted play and movement in a critical structural part of a bicycle.

Folding handlebars date back to the early history of the bicycle and yet tend not to be used in folding bicycles. Early attempts at folding handlebars were to allow for adjustable riding positions. Examples include folding handlebars described by U.S. Pat. No. 864,202 to Simmons (Aug. 27, 1907); U.S. Pat. No. 3,863,521 to Gatsos et al. (Feb. 4, 1975); and U.S. Pat. No. 5,737,967 to Hartley (Apr. 14, 1998). These folding handlebars focus on adjustability while riding and provide little, if any, reduction in size.

On the other hand, folding handlebars which are designed to reduce the size of a bicycle or other vehicle for storage and/or carrying typically rely on mechanisms external to the handlebars and/or introduce weakness and movement in a critical structural component of the vehicle. Mechanisms external to the handlebars (e.g., U.S. Pat. No. 4,634,138 to Fryer et al.—Jan. 6, 1987) such as external spring latch handles pose risks for snagging clothing while riding.

More important, however, is the introduction of weakness and movement into a critical structural component of a bicycle. Handlebars of a bicycle bear heavy loads. In particular, more aggressive contemporary riding styles, e.g., in urban and off-road riding, place a rider's weight more forward with substantial weight over the handlebars. In addition, any bumps or shocks at the front wheel are typically translated directly to the handlebars. While other front-end components are positioned to handle substantial vertical loads of shocks and bumps to the front tire, handlebars literally stand out as the component to handle such loads transversely. Accordingly, handlebars are a structurally critical component of a bicycle, and they must handle transverse loading.

Most conventional folding handlebars introduce a folding mechanism which allows for folding in precisely the transverse direction in which loads are borne. One example is described in British Patent No. 7578 (1891) to Parkes et al. in which handlebars slide out of a tube to expose a joint about which the handlebars fold. In sliding in and out of a tube, the handlebars require a clearance, however small, to allow for such sliding. Such a clearance, however small, introduces play in the handlebars such that the handlebars are capable of movement independent of the remainder of the bicycle and independent of the sliding motion required to fold the handlebars. In particular, such introduces play transverse to the handlebars. Such play, during rugged riding, can cause excessive wear in the handlebars, can cause weakness in the handlebars, and can be annoying to the rider.

What is needed is a folding handlebar, e.g., one suitable for use on a bicycle, which allows virtually no play transverse to the handlebar and which handles transverse loading virtually as well as a conventional, non-folding handlebar.

SUMMARY OF THE INVENTION

In accordance with the present invention, a split cylindrical clamp encloses inner ends of grip bars of a folding handlebar to hold the grip bars in a firm, stationary, and strong riding position. While riding a bicycle in which such folding handlebars are installed, no difference in riding feel of the handlebars is noticed and no play or movement in the respective parts is permitted due to the strength of the split cylindrical clamp.

A single user gesture flips a clamp lever to loosen the split cylindrical clamp allows the grip bars to be slid outward and folded to a folded position. The split cylindrical clamp is then tightened with another single gesture, flipping the clamp lever in an opposite direction, locking the grip bars in the folded position. While locked in the folded position, the grip bars are entirely immobilized, thereby resisting damage to the handlebar and any attached cables and levers during shipping or storage.

Due to the leverage available in an eccentric clamp used to tighten the split cylindrical clamp and the resulting great force, only a small inner portion of the grip bars is placed inside the split cylindrical clamp in the riding position. In addition, the grip ends fold behind the split cylindrical clamp to remain inside the split cylindrical clamp for clamping in the folded position. Accordingly, the folding handlebar is generally no wider than the split cylindrical clamp when folded—an extremely narrow folded handlebar.

DETAILED DESCRIPTION

Figure 1:
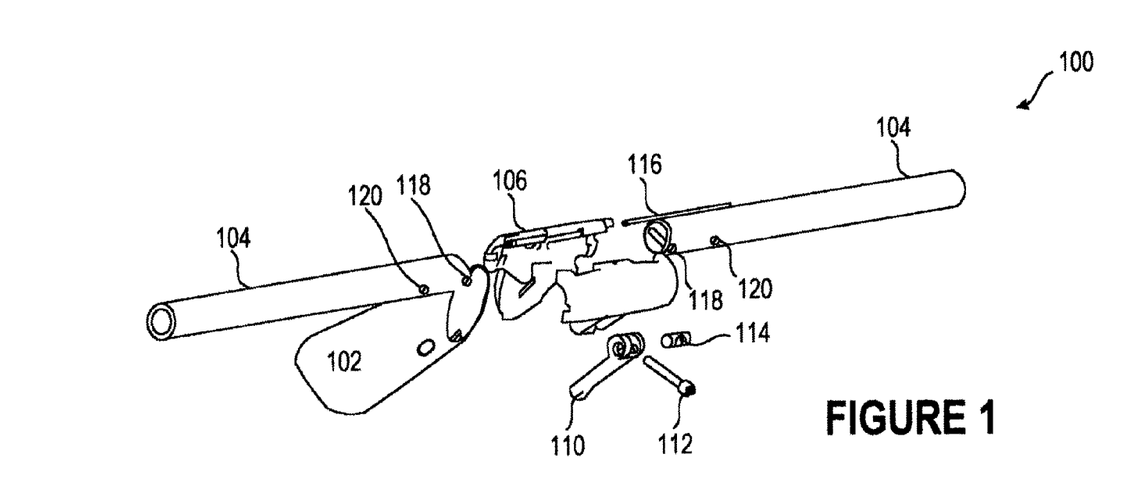
FIGS. 1 and 2 are perspective exploded views of a folding handlebar in accordance with the present invention.

In accordance with the present invention, two grip ends 104 (FIG. 1) of a folding handlebar 100 are firmly held in either a riding position (FIG. 3) or in a folded position (FIG. 4) by a quick-release clamp which includes a clamp 108 (FIG. 1) and a socket 106. In the riding position, clamp 108 and socket 106 firmly and securely hold grip ends 104 in place with no free play and therefore no resulting wear between grip ends 104, clamp 108, and socket 106. More importantly, a rider's control of a bicycle in which folding handlebar 100 is installed is greatly improved by the absolute elimination of play in the various parts of folding handlebar 100. In addition, complete immobilization of grip ends 104 in the folded position (FIG. 4) by clamp 108 and socket 106 prevents damage to grip ends 104 and any brake and/or shift cables and/or levers during transport, e.g., as checked baggage with an airline.

Socket 106 (FIG. 1) is fixed to a stem 102, by adhesive, welding, or press-fit. Stem 102 is in turn fixed to a bicycle or other vehicle controllable by handlebars. Clamp 108 is attached to socket 106 by a hinge pin 116, about which clamp 108 can rotate relative to socket 106. A clamp screw 112 passes through clamp 108 and screws into socket 106. Clamp screw 112 also passes through a clamp pivot 114 and a clamp lever 110. A user tightens and loosens the clamp of socket 106, hinge pin 116, and clamp 108 by moving clamp lever 110 quickly and without tools. This process is described in greater detail below.

Figure 3:
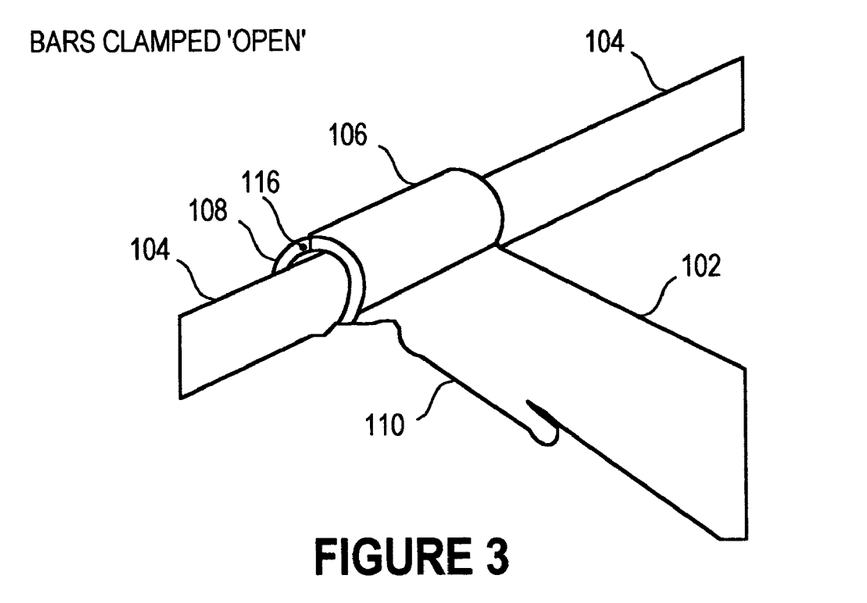
FIG. 3 is a perspective view of the handlebar of FIGS. 1 and 2 in a riding position.
Figure 4:
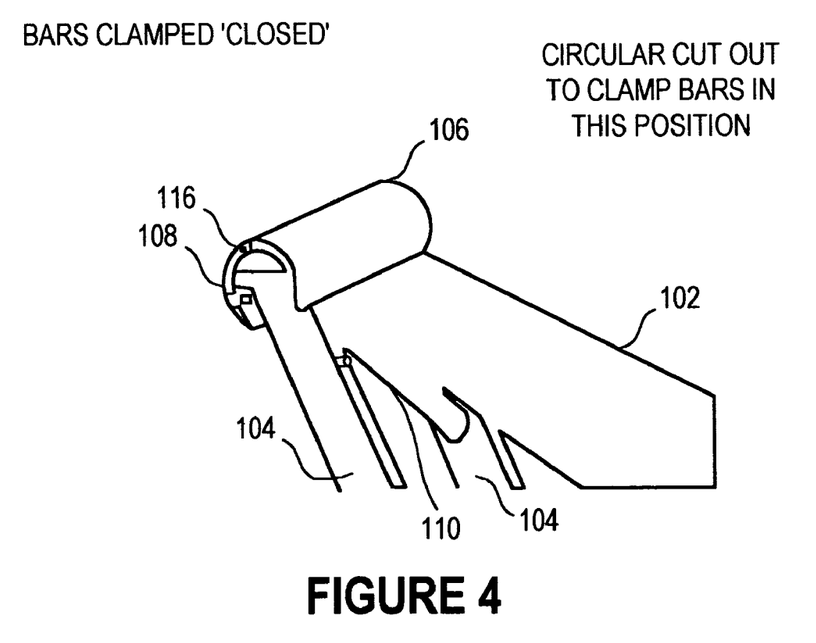
FIG. 4 is a perspective view of the handlebar of FIGS. 1 and 2 in a folded position.

Each grip end 104 includes a inside guide pin 118 and an outside guide pin 120, both of which protrude entirely through grip ends 104. Inside guide pins 118 remain within the clamp of socket 106, hinge pin 116, and clamp 108 while outside guide pins 120 are inside that clamp in the riding position as shown in FIG. 3 and are outside that clamp in the folded position as shown in FIG. 4.

Figure 2:
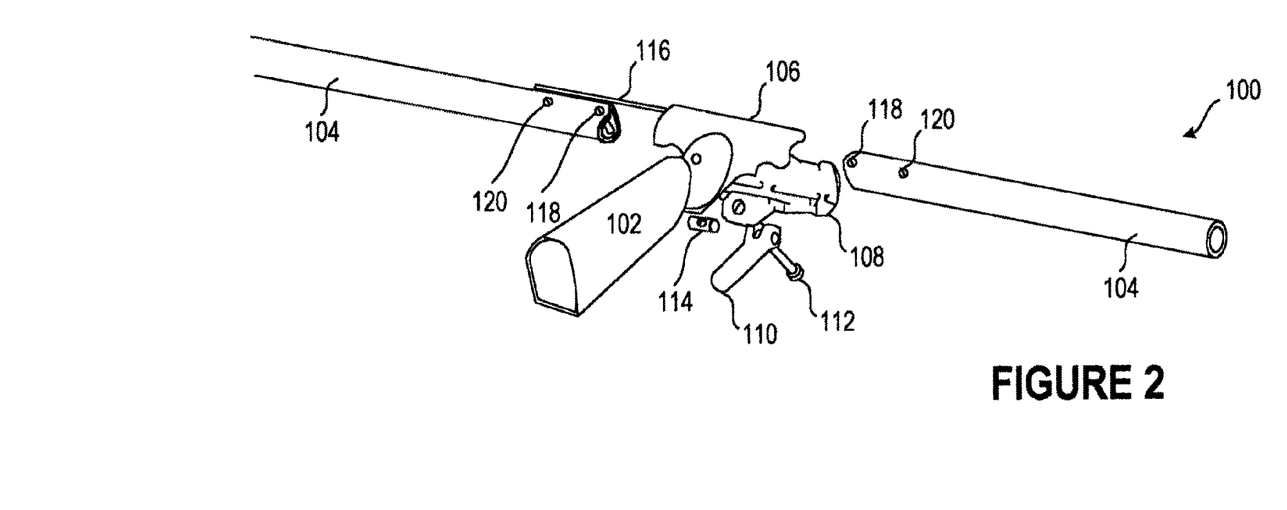

FIG. 2 shows folding handlebar 100 from a slightly different perspective.

Figure 5:
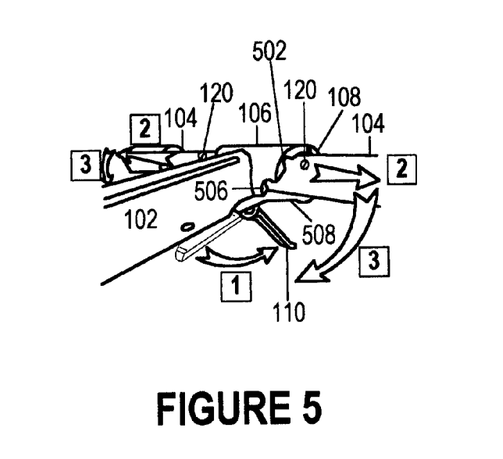
FIGS. 5 and 6 illustrate transition of the folding handlebar of FIGS. 1–4 from the riding position to the folded position.
Figure 6:
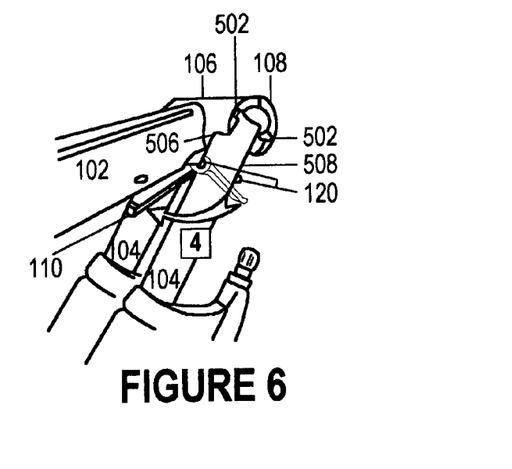

FIGS. 5 and 6 illustrate the folding of handlebar 100 from the riding position to the folded position. In step 1 (FIG. 5), the user moves clamp lever 110 forward to loosen clamp 108 from socket 106. Clamp lever 110 is an eccentric clamp. Eccentric clamps are known and are not described further herein. Loosening of clamp 108 from socket 106 releases pressure placed upon grip ends 104 by clamp 108 and socket 106, allowing movement of grip ends 104 between clamp 108 and socket 106.

In step 2, the user slides grip ends 104 outward, away from the center of socket 106. Outside guide pins 120 slide out of outside guides 502, allowing grip ends 104 to pivot about inside guide pins 118 which remain contained within the clamp of socket 106 and clamp 108. In step 3, the user pivots grip ends 104 about concealed inside guide pins 118 until grip ends 104 are positioned within respective retention recesses 506–508 (FIG. 6).

Retention recesses 506–508 are generally the size and shape of the outer cross-sectional shape of grip ends 104, e.g., circular and having a diameter of 2.2 cm in this illustrative embodiment. Each retention recess 506–508 has a socket recess 506 on socket 106 and a clamp recess 508 on clamp 108. In step 4, the user moves clamp lever 110 back to move clamp 108 toward socket 106 to thereby clamp grip ends 104 within respective retention recesses 506–508. As a result, grip ends 104 are firmly immobilized and secured.

Figure 7:
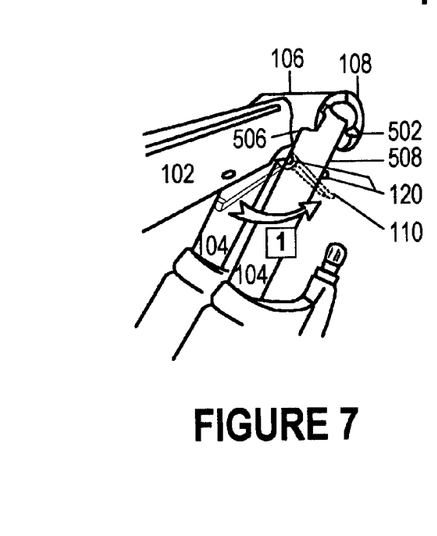
FIGS. 7–9 illustrate transition of the folding handlebar of FIGS. 1–4 from the folded position to the riding position.
Figures 8, 9:
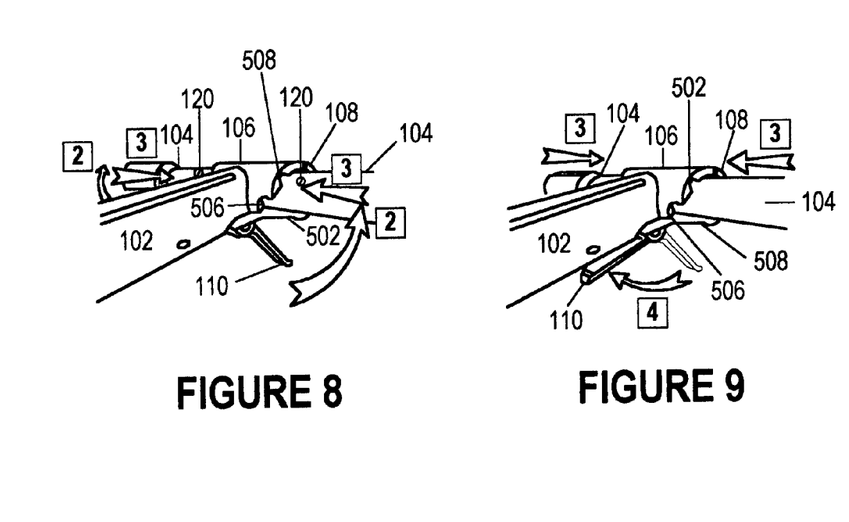

The transition from the folded position to the riding position is merely the reverse of these steps as illustrated in FIGS. 7–9. In step 1 (FIG. 7), the user moves clamp lever 110 forward, loosening retention recesses 506–508 to free grip ends 104. In step 2 (FIG. 8), the user moves grip ends 104 from the folded position to the riding position and, in step 3, slides grip ends 104 into a cylindrical recess between socket 106 and clamp 108. In sliding grip ends 104 in step 3, outside guide pins 120 slide into guides 502. In step 4 (FIG. 9), the user moves clamp lever 110 back to tighten socket 106 and clamp 108 about grip ends 104 to hold them securely for carefree riding as if grips ends 104 were a single, integral handlebar.

Figure 13:
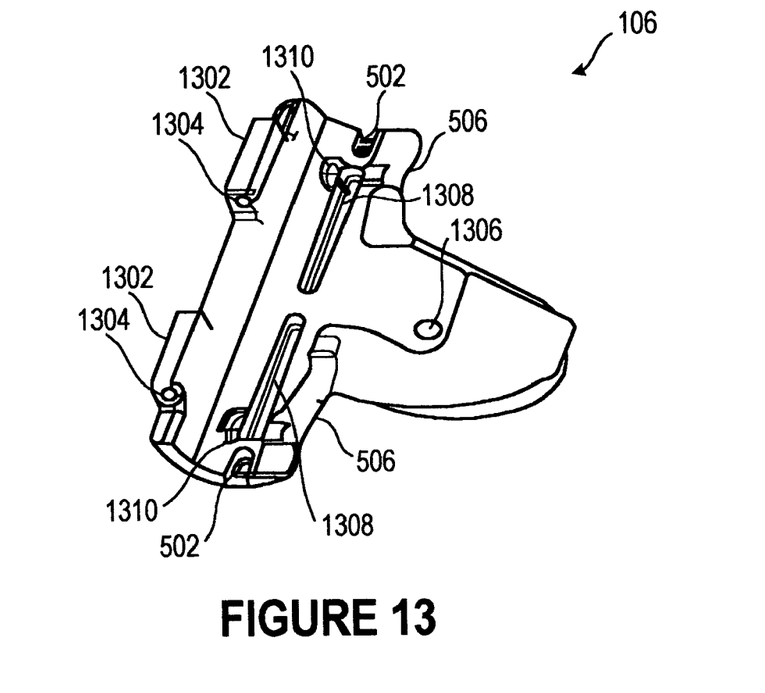
FIG. 13 is a perspective view of a socket of the split cylindrical clamp of the folding handlebar of FIGS. 1–2.

FIG. 13 shows socket 106 in a perspective view. In addition to outside guides 502, socket 106 includes insides guides 1308 in which inside guide pins 118 (FIG. 1) are positioned and within which guide pins 118 slide. Socket 106 (FIG. 13) also includes holes 1304 for hinge pin 116 (FIG. 1) and a drilled and tapped hole 1306 into which clamp screw 112 is screwed.

Figure 14:
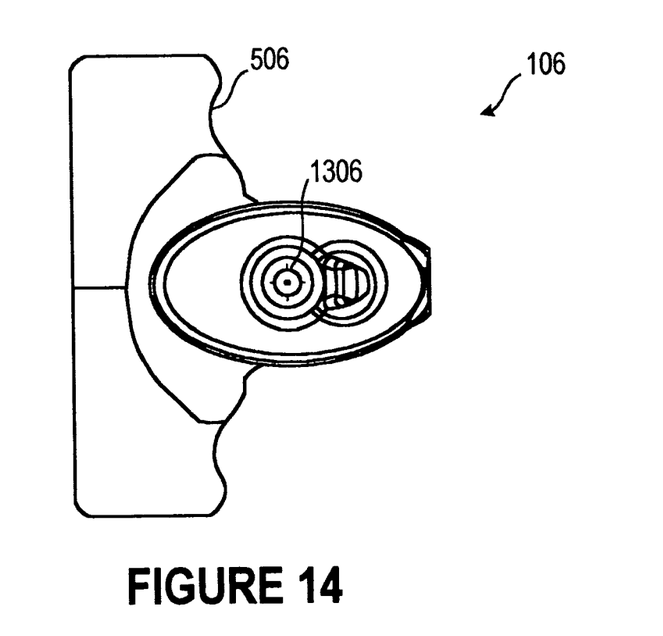
FIG. 14 is a bottom plan view of the socket of FIG. 13.
Figure 15:
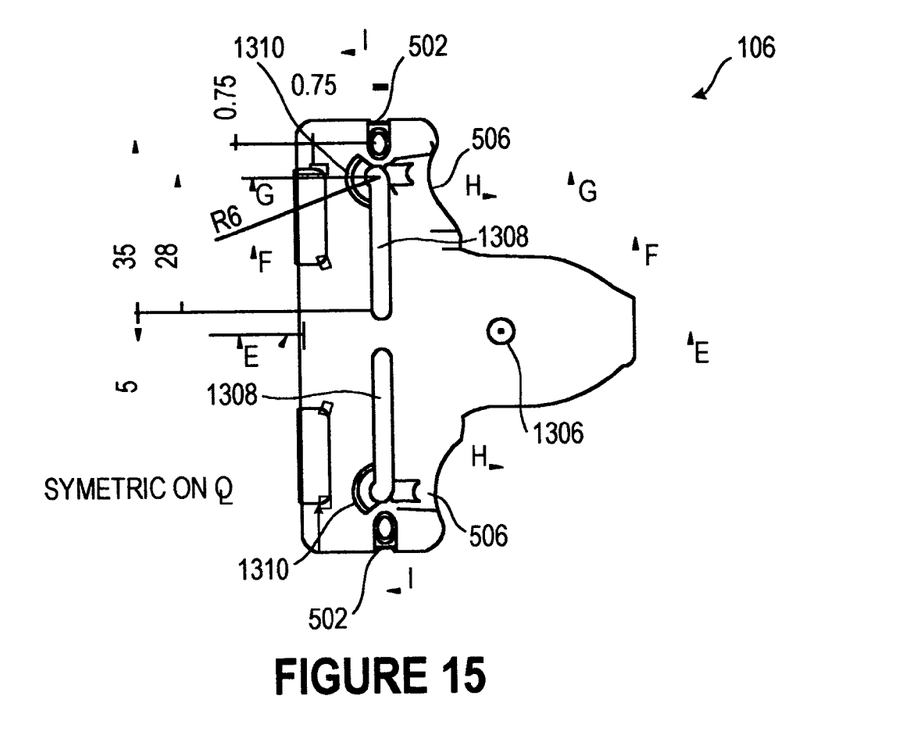
FIG. 15 is a top plan view of the socket of FIG. 13.
Figure 16:
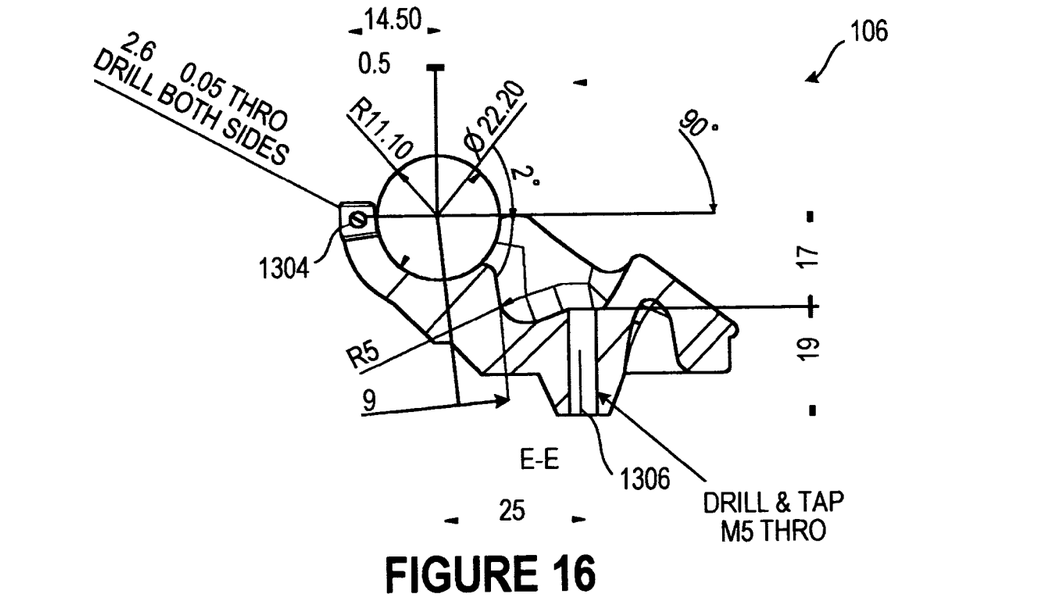
FIG. 16 is a cross-section view taken at line E—E (FIG. 15) of the socket of FIG. 13.
Figure 17:
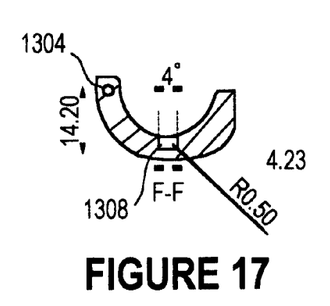
FIG. 17 is a cross-section view taken at line F—F (FIG. 15) of the socket of FIG. 13.
Figure 18:
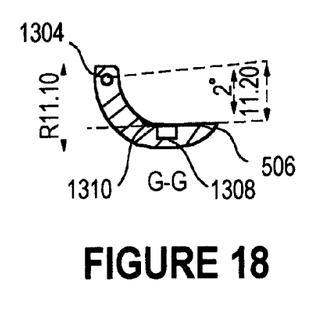
FIG. 18 is a cross-section view taken at line G—G (FIG. 15) of the socket of FIG. 13.
Figure 19:
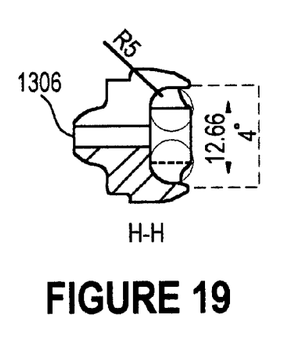
FIG. 19 is a cross-section view taken at line H—H (FIG. 15) of the socket of FIG. 13.
Figure 20:
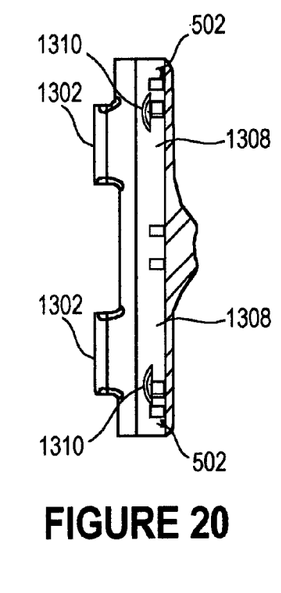
FIG. 20 is a cross-section view taken at line I—I (FIG. 15) of the socket of FIG. 13.

FIG. 14 is a bottom plan view of socket 106. FIG. 15 is a top plan view of socket 106. FIG. 16 is a cross-section view taken at line E—E (FIG. 15). FIG. 17 is a cross-section view taken at line F—F (FIG. 15). FIG. 18 is a cross-section view taken at line G—G (FIG. 15). FIG. 19 is a cross-section view taken at line H—H. FIG. 20 is a cross-section view taken at line I—I.

Figure 21:
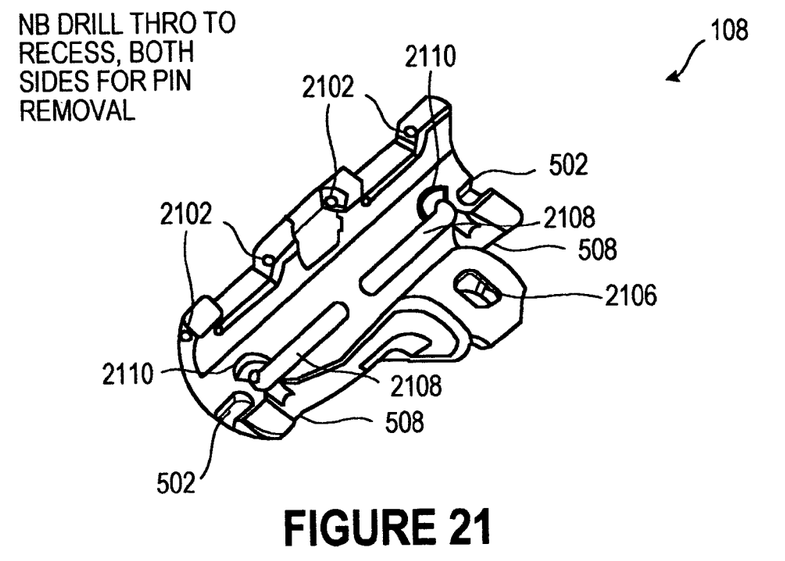
FIG. 21 is a perspective view of a clamp of the split cylindrical clamp of the folding handlebar of FIGS. 1–2.
Figure 22:
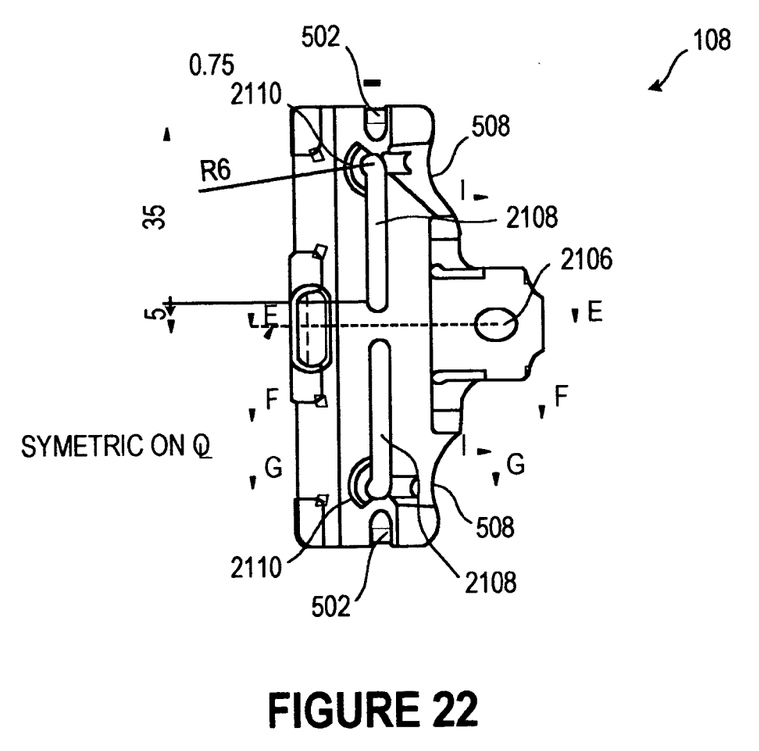
FIG. 22 is a bottom plan view of the clamp of FIG. 21.

FIG. 22 shows clamp 108 in a perspective view. In addition to outside guides. 502, clamp 108 includes insides guides 2108 in which inside guide pins 118 (FIG. 1) are positioned and within which guide pins 118 slide. Clamp 108 (FIG. 21) also includes holes 2102 for hinge pin 116 (FIG. 1) and a drilled hole 2106 (FIG. 21) through which clamp screw 112 (FIG. 1) moves freely.

Figure 23:
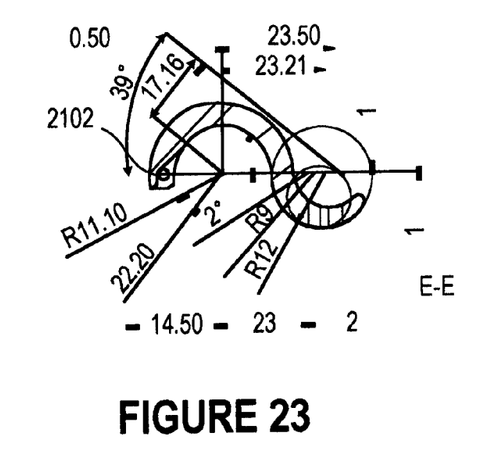
FIG. 23 is a cross-section view taken at line E—E of the clamp of FIG. 22.
Figure 24:
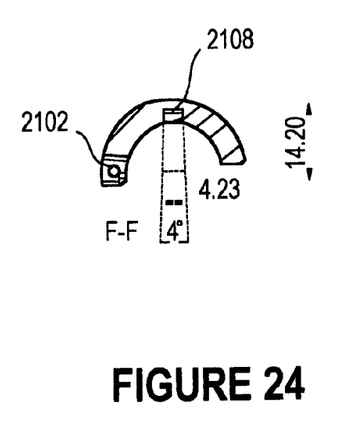
FIG. 24 is a cross-section view taken at line F—F of the clamp of FIG. 22.
Figure 25:
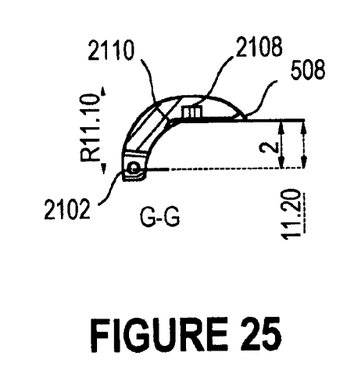
FIG. 25 is a cross-section view taken at line G—G of the clamp of FIG. 22.
Figure 26:
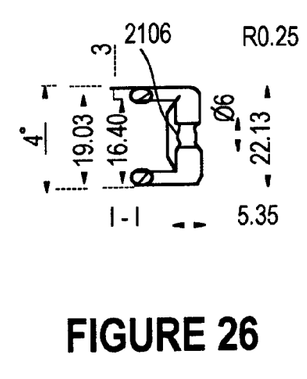
FIG. 26 is a cross-section view taken at line I—I of the clamp of FIG. 22.

FIG. 22 is a bottom plan view of clamp 108. FIG. 23 is a cross-section view of clamp 108 taken at line E—E (FIG. 22). FIG. 24 is a cross-section view of clamp 108 taken at line F—F (FIG. 22). FIG. 25 is a cross-section view of clamp 108 taken at line G—G (FIG. 22). FIG. 26 is a cross-section view of clamp 108 taken at line I—I (FIG. 22).

Figure 10:
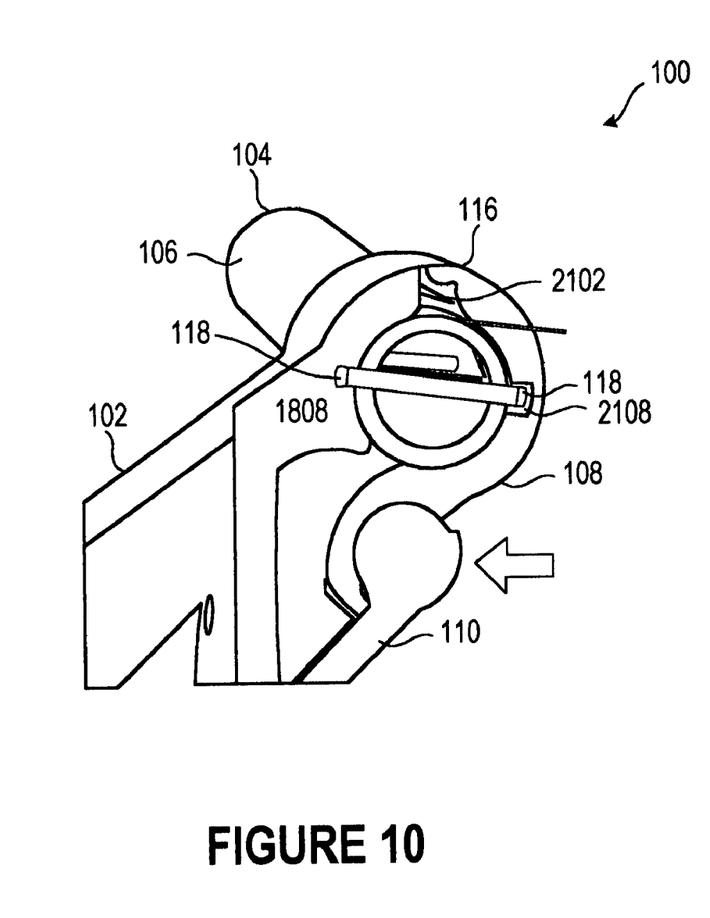
FIGS. 10–12 are cross-section views of the folding handlebar of FIGS. 1–2 showing design details.
Figure 11:
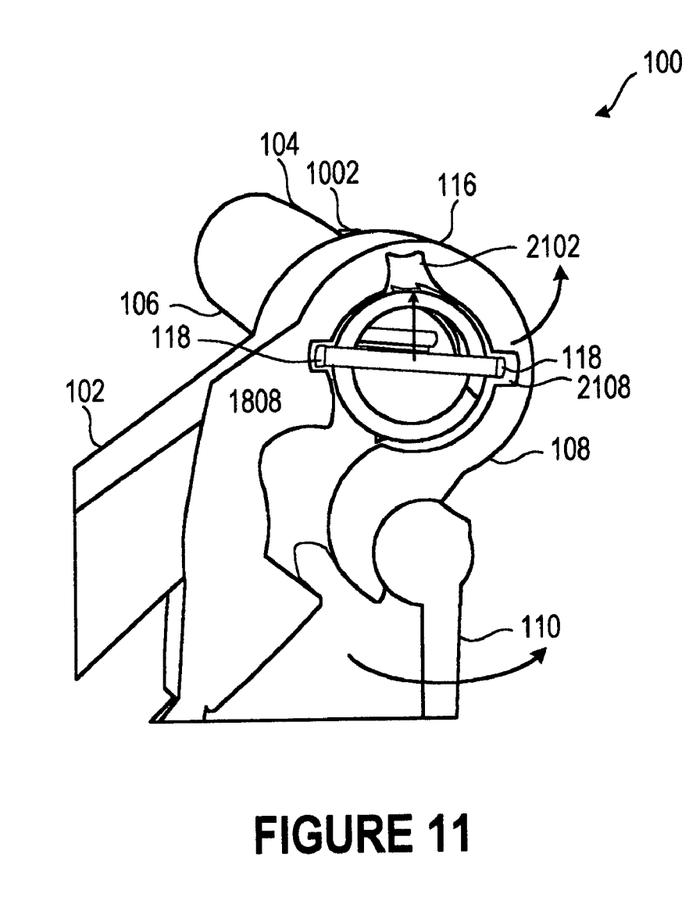

FIGS. 10 and 11 are cross-section views of folding handlebar 100 illustrating a few details. In this illustrative embodiment, holes 2102 of clamp 108 are open such that clamp 108 can easily be removed without removing hinge pin 116—either for assembly or for maintenance. In addition, the upper inner portions of socket 106 and clamp 108 are rounded off to form a crescent-shaped gap 1002 in the vicinity of hinge pin 116 between grip end 104 and the hinge formed of hinge pin 116, socket 106, and clamp 108. Crescent-shaped gap 1002 allows clamp 108 to rotate about hinge pin 116 relative to socket 106 without interference by grip end 104. Crescent-shaped gap 1002 is positioned such that substantially less than 50% of the outer perimeter of grip end 104 is precisely fit by either socket 106 or clamp 108. Accordingly, neither socket 106 nor clamp 108 grips grip end 104 when clamp 108 is loosened.

For similar reasons, inside guides 1308 and 2108 (FIG. 10) do not tightly fit inside guide pins 118 but are instead widened by an angle of four (4) degrees as shown in FIGS. 17 and 24. Accordingly, enough play is permitted to enable rotation of clamp 108 (FIGS. 10 and 11) about hinge pin 116 relative to socket 106 without interference by grip end 104.

Figure 12:
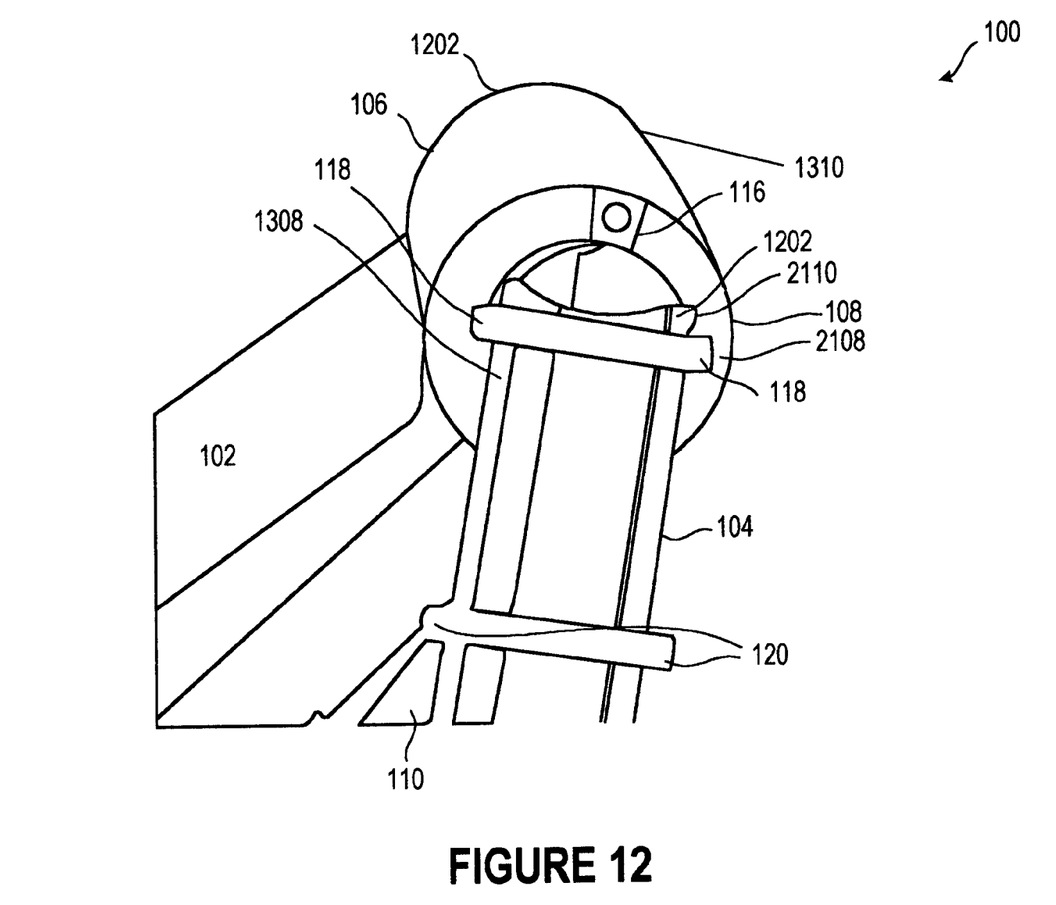

FIG. 12 is another cross-section view of folding handlebar 100 illustrating additional detail. FIG. 12 shows grip end 104 in the folded position. A portion 1202 of grip end 104 extends beyond inside guide pin 118. To permit rotation of grip end 104 about inside guide pin 118, socket 106 and clamp 108 have respective recesses 1310 and 2110 to accommodate portion 1202 throughout rotation of grip end 104 and with grip end 104 in the folded position.

Figure 27:
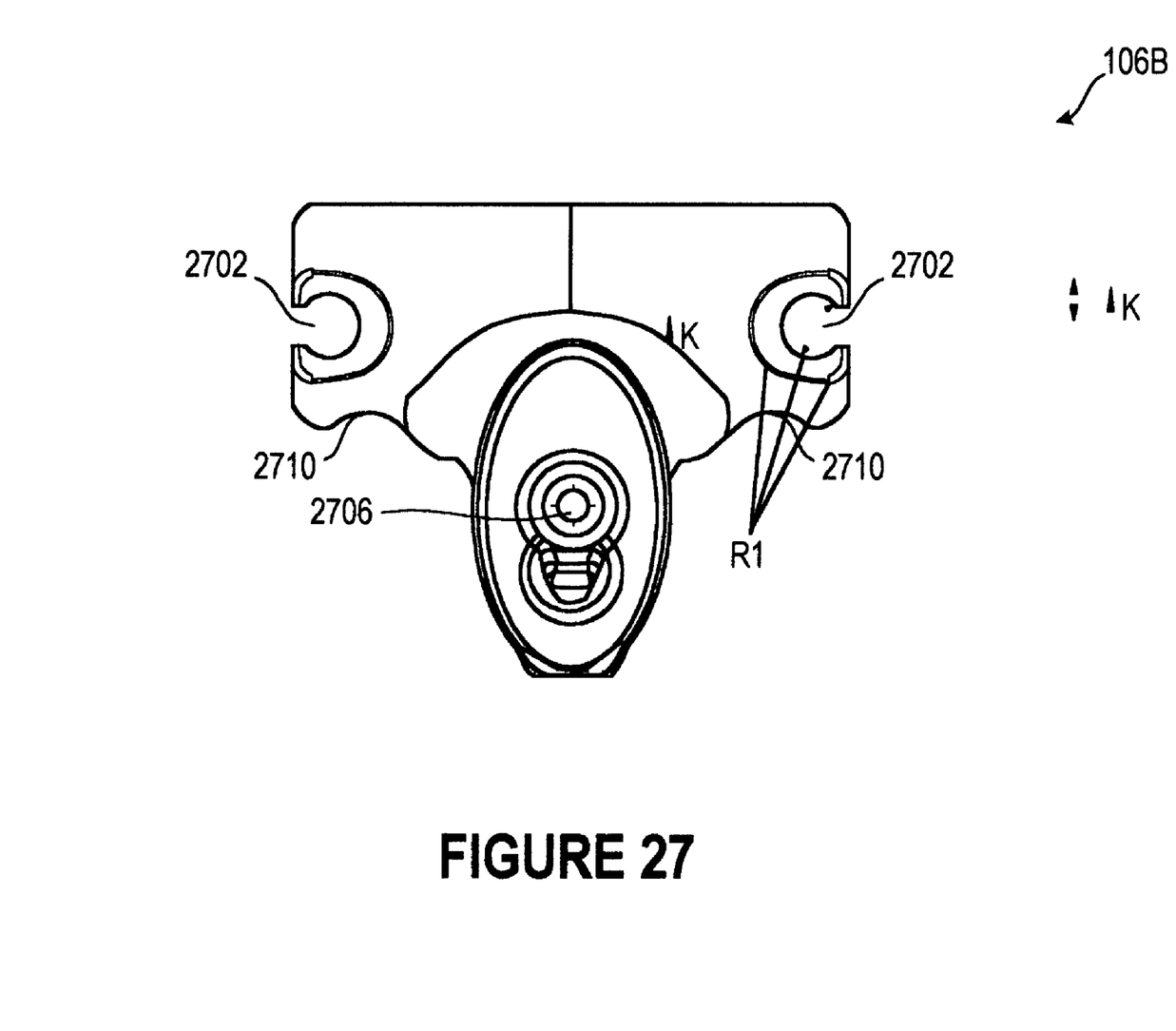
FIG. 27 is a top plan view of a socket of an alternative embodiment of the split cylindrical clamp of the folding handlebar of FIGS. 1–2.

FIG. 27 shows an alternative embodiment of socket 106 as socket 106B. A tapped hole 2706 and retention recesses 2710 are analogous to tapped hole 1306 (FIG. 13) and retention recesses 506 (FIG. 5), respectively. However, outside guides 502 of socket 106 are replaced with outside guides 2702 (FIG. 27) of socket 106B. Outside guides 2702 are generally circular with an opening smaller than the diameter of outside guides 2702. Outside guide pins 118 (FIG. 1) of grip ends 104 are replaced in this alternative embodiment with spring loaded, rounded or tapered push buttons which can only be removed from outside guides 2702 (FIG. 27) when pressed by the user. Accordingly, inadvertent loosening of clamp lever 110 (FIG. 1) is insufficient to permit accidental sliding of grip ends 104 outward and resulting accidental folding of grip ends 104 during riding of a bicycle on which folding handlebar 100 is installed.

In another alternative embodiment, an elastic cord is stretched between respective inside guide pins 118 of grip ends 104 to resist inadvertent extraction as shown in step 2 of FIG. 5 and to assist insertion as shown in step 3 of FIG. 9. Some embodiments include both push-button outside guide pins as described with respect to FIG. 27 and the elastic cord described immediately above.

In the illustrative embodiment shown in the figures, all shown measurements are in millimeters and all tolerances, unless otherwise shown in the figures, are ±0.5 mm for measurements rounded to the nearest millimeter, ±0.2 mm for measurements shown to one decimal place, ±0.1 mm for measurements shown to two decimal places, and ±0.25 degrees for angles. Sockets 106 and 106B and clamp 108 are made of forged aluminum 7005 with a minimum yield strength of 170 MPa.

The above description is illustrative only and is not limiting. Therefore, the present invention is defined solely by the claims which follow and their full range of equivalents.

What is claimed is:

1. A folding handlebar comprising:
   two grip ends, each of which includes an inside end; and
   a clamp positioned about the perimeter of the inside ends of the grip ends and which can be tightened to lock each grip end in a riding position and can be tightened to lock each grip in a folded position and which can be loosened to permit movement of each grip end between the riding position and the folded position;
   wherein the clamp includes a hinge;
   further wherein the hinge connects two parts of the clamp that can rotate relative to one another about the hinge;
   further wherein tightening of the clamp rotates the two parts in a first direction relative to one another; and
   further wherein loosening of the clamp rotates the two parts in a second, opposite direction relative to one another.

2. The folding handlebar of claim 1 wherein the clamp includes a split cylindrical clamp.

3. The folding handlebar of claim 2 wherein the two parts define a split cylinder of the split cylindrical clamp.

4. The folding handlebar of claim 3 wherein the inside ends each have a respective cross sectional shape; and
   further wherein the split cylinder as defined by the two parts has a cross section that matches the cross sections of the inside ends.

5. The folding handlebar of claim 4 wherein the two parts, when the clamp is locked in the riding position, collectively directly press substantially the entirety of the perimeter of the inside ends.

6. The folding handlebar of claim 1 wherein the clamp can be tightened in a single user gesture.

7. The folding handlebar of claim 1 wherein the clamp includes an eccentric clamp.

8. The folding handlebar of claim 1 wherein the clamp, when in an unlocked state, resists inadvertent folding of the grip ends when in the riding position.

* * * * *